United States Patent
Prigge et al.

(10) Patent No.: US 11,633,687 B2
(45) Date of Patent: Apr. 25, 2023

(54) AIR PURIFIER

(71) Applicant: Vitality Ventures HK Company Limited, Mill Valley, CA (US)

(72) Inventors: Grant Prigge, Belvedere-Tiburon, CA (US); Yordan Konstantinov Kralev, Sofia (BG)

(73) Assignee: Vitality Ventures HK Company Limited, Mill Valley, CA (US)

( * ) Notice: Subject to any disclaimer, the term of this patent is extended or adjusted under 35 U.S.C. 154(b) by 29 days.

(21) Appl. No.: 16/895,480

(22) Filed: Jun. 8, 2020

(65) Prior Publication Data
US 2021/0379524 A1 Dec. 9, 2021

(51) Int. Cl.
| | | |
|---|---|---|
| *B01D 46/44* | (2006.01) | |
| *B01D 46/46* | (2006.01) | |
| *B01D 46/00* | (2022.01) | |

(52) U.S. Cl.
CPC ....... *B01D 46/442* (2013.01); *B01D 46/0043* (2013.01); *B01D 46/46* (2013.01); *B01D 2273/30* (2013.01); *B01D 2279/51* (2013.01)

(58) Field of Classification Search
CPC .............. B01D 46/0043; B01D 46/442; B01D 2273/30; B01D 2279/00; B01D 2279/40; B01D 2279/50; B01D 2279/51; B01D 2279/65; B01D 2279/4508; B01D 46/46; F24F 11/64; F24F 8/10; F24F 8/80; F24F 2110/64; F24F 3/16; F24F 2110/50; F24F 2110/66; F24F 2110/70; F24F 2110/72;
(Continued)

(56) References Cited

U.S. PATENT DOCUMENTS

| | | | | |
|---|---|---|---|---|
| 2006/0064204 | A1* | 3/2006 | Kim | ........................ F24F 11/30 |
| | | | | 700/276 |
| 2016/0121255 | A1* | 5/2016 | Zhang | .................. B01D 46/422 |
| | | | | 95/12 |

(Continued)

FOREIGN PATENT DOCUMENTS

| | | | | | |
|---|---|---|---|---|---|
| CN | 111076373 | A | * | 4/2020 | ............. Y02B 30/70 |
| KR | 20190103661 | A | * | 9/2019 | ............. F24F 11/52 |

OTHER PUBLICATIONS

KR20190103661A_ENG (Espacenet machine translation of Park) (Year: 2019).*

(Continued)

*Primary Examiner* — Jonathan Miller
*Assistant Examiner* — Gabriel E Gitman
(74) *Attorney, Agent, or Firm* — Hammer & Associates, P.C.

(57) ABSTRACT

An air purifier including a fan having a plurality of fan speeds; a filter, wherein the fan draws air through the filter; a user interface in communication with a control system; wherein upon activation of the control system, the control system identifies an initial air quality index (AQI) based upon a geographic location of the air purifier, a room size based upon the type of room in which the air purifier is placed, and identifies a fan speed set by a user through the user interface, and determines a target air quality index achievable in thirty minutes of fan operation is provided. Further provided is an air purifier capable of predicting and updating time to achieve a target air quality and a target air quality based on a number of environmental factors.

16 Claims, 4 Drawing Sheets

Step 1: Target AQI is calculated based on fan speed.

Step 2: Time to clean is calculated based on the Target AQI - Current AQI.

Step 3: The target is achieved when Current AQI = Target AQI

(58) Field of Classification Search
CPC ........ F24F 2120/10; F24F 11/30; F24F 11/52; F24F 11/61; F24F 11/77; F24F 11/39; F24F 8/108; F24F 8/00
See application file for complete search history.

(56) References Cited

U.S. PATENT DOCUMENTS

| | | | | |
|---|---|---|---|---|
| 2018/0045206 A1* | 2/2018 | Birk | ........................ | B01D 46/46 |
| 2018/0073759 A1* | 3/2018 | Zhang | ...................... | F24F 11/30 |
| 2018/0290104 A1* | 10/2018 | Jong | ....................... | B01D 53/30 |
| 2018/0299159 A1* | 10/2018 | Ajax | ........................ | F24F 11/46 |
| 2018/0318746 A1* | 11/2018 | Thomas | ................... | F24F 11/39 |
| 2018/0363238 A1* | 12/2018 | Birtles | ................... | D06M 11/46 |
| 2019/0085852 A1* | 3/2019 | Brown | ............... | B01D 46/0038 |
| 2019/0308122 A1* | 10/2019 | Aries | .................. | B01D 46/442 |

OTHER PUBLICATIONS

CN111076373A_ENG (IP.com machine translation of Lu) (Year: 2020).*

* cited by examiner

| Step 1: Target AQI is calculated based on fan speed. | Step 2: Time to clean is calculated based on the Target AQI - Current AQI. | Step 3: The target is achieved when Current AQI = Target AQI |

AIR PURIFIER

FIELD OF THE INVENTION

The invention relates to an air purifier having a control system for predicting air quality levels and time to achieve air quality levels and associated hardware for improving air quality index.

BACKGROUND OF THE INVENTION

The growing effect of pollution and global warming are increasing the need for air purifiers. These products use a filtration media, such as high-efficiency particulate air (HEPA) filters, to remove harmful airborne particulates from the air. However, air purifiers have a fundamental flaw that holds back adoption. Specifically, with current air purifiers, consumers have no way to adequately, or intuitively, measure their effectiveness in particulate matter (PM) removal. This is because current air purifiers have rudimentary control systems with simple low, medium, and high fan speeds or arbitrary "auto" modes.

To compound the problem, currently available air purifiers have no sensory feedback other than the noise made by the fan operation. Unlike air conditioners, for example, with which you can feel a change of temperature, consumers can't feel, taste, or smell, usually, the impact of the air purifier. As a result, consumers have no way to a) measure the effectiveness of their air purifier or b) determine if they have it set to a correct setting for their space.

Currently available air purifiers have rudimentary manual controls that give the user generally from 3 to 10 fan speeds. However, each purifier has its own performance ratings so setting two different models to the same speed will generate different outcomes. And since every room has a different volume, setting the same device to the same speed in two different rooms will result in completely different performance.

Some currently available air purifiers have tried to solve this problem by installing a particle sensor to show the user what the air quality is in their home by way of certain standards, such as air quality index (AQI). AQI is generally known as a function of the amount of particles in the air having a diameter of 2.5 microns or less (PM 2.5). Herein the USA standards for correlation between AQI and PM 2.5 are used. While this is a step in the right direction, it does not permit the user to set the target AQI nor does it provide the user with any guidance on the fan speed or time needed to reach a target AQI. Rather, a user would need to use trial and error to reach a desired AQI.

Yet other currently available air purifiers have an "Auto" fan speed feature. Such feature uses a simple if/then function to set fan speed based on certain thresholds in AQI. For example, such feature may function as follows: if AQI is between 0-50, then set fan speed to low; if AQI is between 51-100, then set fan speed to medium, or if AQI is over 101, then set fan speed to high. The problem with such features is that each air purifier manufacturer uses different thresholds of AQI ranges. That is, each manufacturer has their own air quality ranges for good, medium or bad air qualities and for low, medium, or high fan speeds. For example, some companies market how quiet their air purifier is but they achieve quietness by increasing the permissible particulate threshold levels. The result may be an air purifier that is so quiet that it does not remove an effective amount of the harmful air particles. Because such information is not shared with the consumer, the consumer does not know whether the air purifier is, in fact, effective.

SUMMARY OF THE INVENTION

A first embodiment of the invention provides an air purifier comprising a fan having a plurality of fan speeds; a filter, wherein the fan draws air through the filter; a user interface in communication with the fan and with a control system; wherein upon activation of the control system, the control system identifies an initial air quality index (AQI) based upon a geographic location of the air purifier, a room size based upon the type of room in which the air purifier is placed, and identifies a fan speed set by a user through the user interface, and determines a target air quality index after the first thirty minutes of fan operation based on the fan speed, room size, and initial AQI.

In yet another embodiment of the invention, the air purifier control system dynamically updates the time to achieve a target AQI based on the natural room air changes per hour and actual air changes per hour induced by the fan.

In yet another embodiment of the invention, the air purifier automatically maintains a predetermined air quality level in a room by changing the fan angular velocity and dependent upon the presence or absence of humans or pets in the room.

DETAILED DESCRIPTION OF THE INVENTION

The inventive air purifier comprises a fan having a plurality of fan speeds; a filter, wherein the fan draws air through the filter; a user interface in communication with the fan and with a control system; wherein upon activation of the control system, the control system identifies an initial air quality index (AQI) based upon a geographic location of the air purifier, a room size based upon the type of room in which the air purifier is placed, and identifies a fan speed set by a user through the user interface, and determines a target air quality index after thirty minutes of fan operation, based on the fan speed, room size, and initial AQI.

Figure 1:
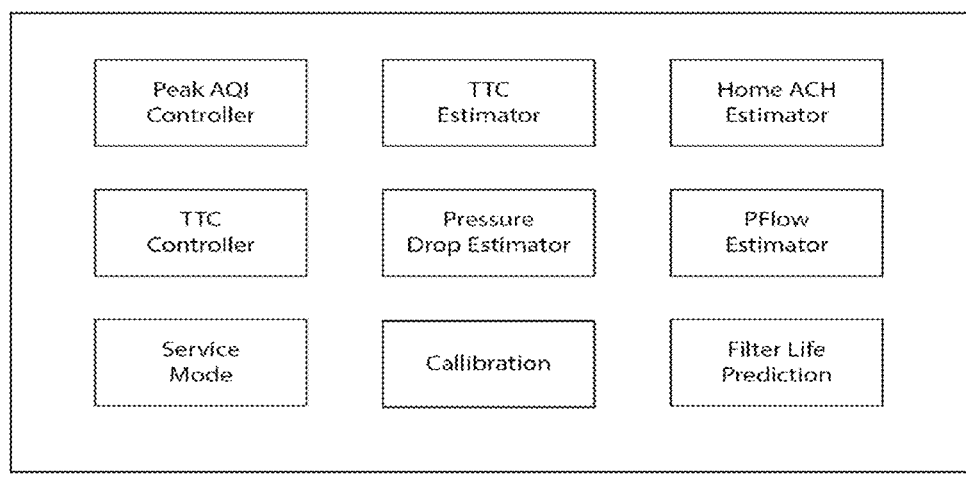
FIG. 1 is a schematic illustrating the separate components of the control system used in the present invention.

As shown in FIG. 1, the control system used in the inventive air purifier includes several modules for dynamically determining a target AQI and a time to achieve the target AQI. Such modules include a Peak AQI Controller, a TTC Estimator which provides an algorithm to initially calculate the time to achieve the target AQI, a Home ACH Estimator which provides an initial estimate on the natural room air changes per hour based on anticipated drafts and inherent ventilation, a TTC Controller which dynamically estimates the time to target AQI based upon the natural room air changes per hour and actual pressure drop across the fan, Pressure Drop Estimator, which calculates an expected pressure drop across the filter induced by the fan based upon the initial AQI, and PFlow Estimator, which dynamically updates the air changes per hour induced by the fan based on the changing pressure drop across the filter induced by the fan.

Figure 2:
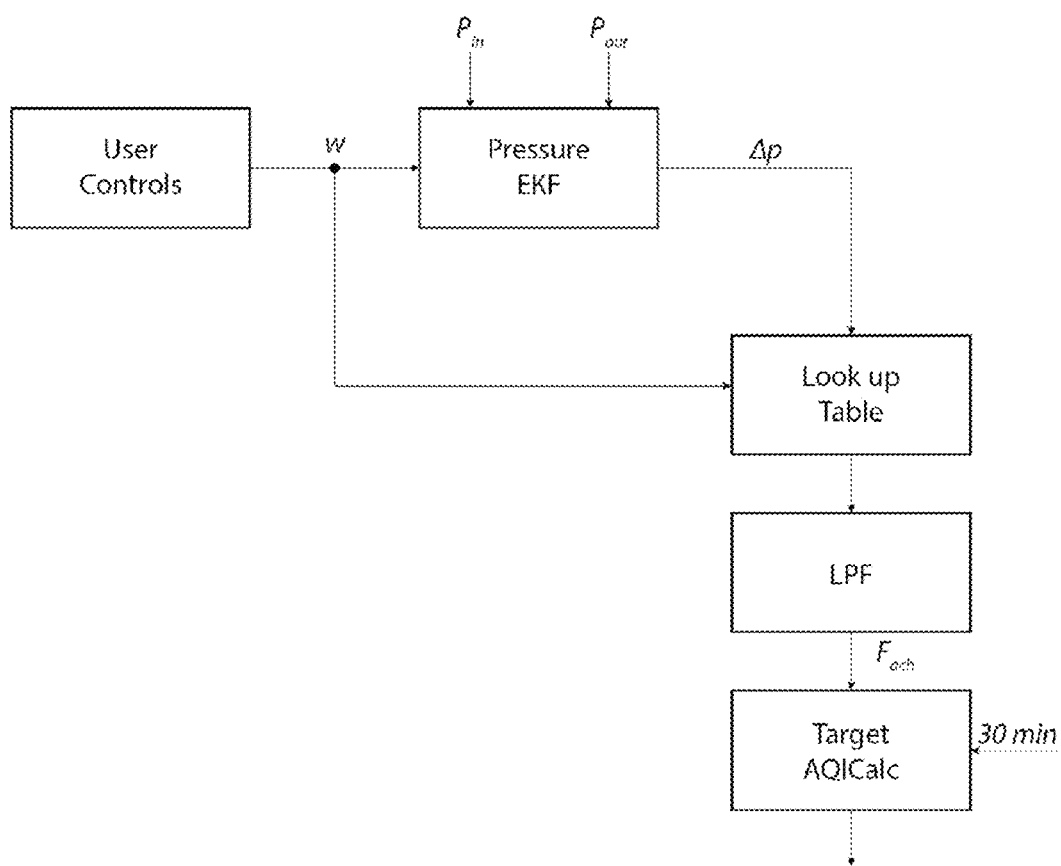
FIG. 2 is a schematic illustrating the target AQI calculation by the control system.
Figure 4:
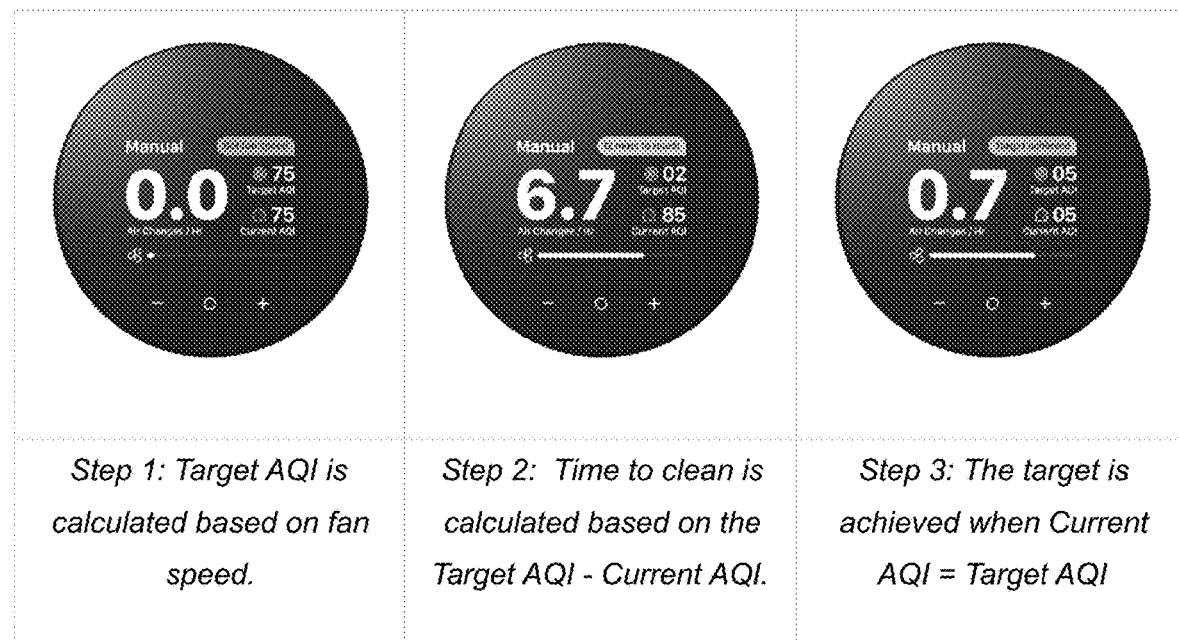
FIG. 4 illustrates the user interface at three different times: (1) at initiation of the air purifier, (2) upon initial calculation of TTC, and (3) when the target AQI is achieved.

The control system operates in one of two high level modes, automatic or manual. In manual mode, the user sets the desired level of cleaning by touching dedicated (+) or (−) buttons, as can be seen in the exemplary user interface shown in FIG. 4. This action, in fact, sets the fan angular velocity, or speed, to one of eight levels. However, the angular velocity doesn't give appropriate indication for the intensity of cleaning such that a user could intuitively relate to a level of air cleanliness. The control system estimates the instantaneous air changes per hour (ACH) taking into account the fan angular velocity, pressure drop across the filter and estimated room size. Estimated room size is initially determined by historical data on average square footages and volumes for rooms in houses having specific ranges of total square footage in specified geographic locations. Assuming close to 100% filter efficiency, ACH is a direct measure of the cleaning capacity provided by the fan angular velocity setting. To complement the ACH information the control system also relies upon an initial AQI to predict the target AQI after thirty minutes of fan operation at the selected fan angular velocity. The actual AQI is initially determined based on historical data of indoor AQI in a large number of geographical locations. That AQI prediction is called Target AQI and is obtained from the solution of the first order ordinary differential equation relating indoor and outdoor particle concentration to cleaning intensity measured by fan induced ACH and natural room ACH. This process is schematically displayed in FIG. 2. In FIG. 2, the User Controls of the User Interface are operated to set an initial fan angular velocity, wherein w indicates the initial fan angular velocity set by the user. The pressure drop across the filter is estimated using a standard estimator, such as an Extended Kalman Filter (EKF) or the like, resulting in a pressure drop value. The control system references a Look Up Table which includes pressure drop versus air flow data for the fan. Assessing the data from the Look Up Table with a second order low pass filter (LPF) provides an estimated room air changes per hour, $F_{ach}$. Using the initial $F_{ach}$, an initial Target AQI is calculated for thirty minutes of fan operation (Target AQICalc) resulting in a target AQI (ri). This initial Target AQI may be displayed on the user interface.

Figure 3:
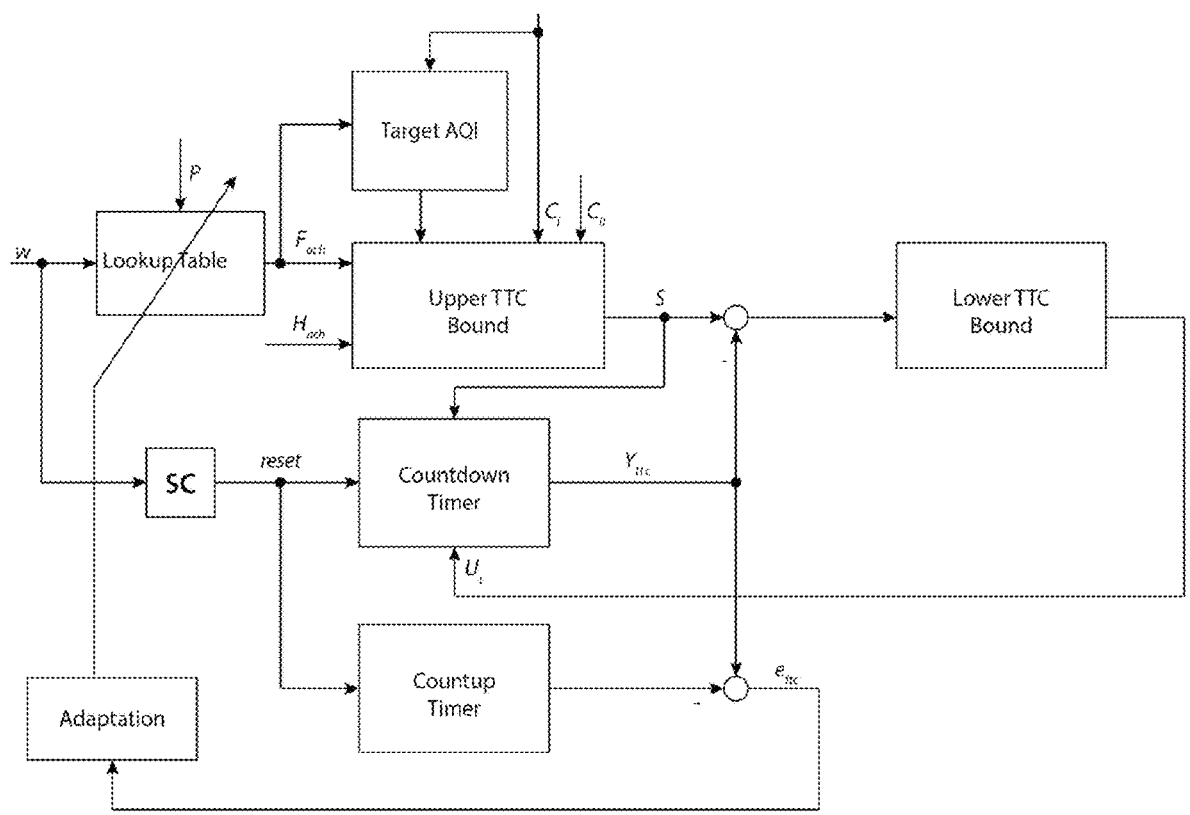
FIG. 3 is a schematic illustrating the time to achieve target AQI (TTC) estimation for dynamically updating the TTC.

The time to reach the target AQI (TTC) is then dynamically updated using the process schematically shown in FIG. 3. Specifically, the TTC is continuously updated to account for three driving forces: (1) an upper bound of TTC assuming no external particle sources during the cleaning, (2) direct countdown timer measuring the time left to reach the target and, (3) lower bound of TTC calculated as dynamic correction to the countdown timer upwards proportional to the difference between TTC estimate and the TTC upper bound. Such updated TTC values are displayed on the user interface. When the target AQI is reached all three components of the TTC calculation converge to zero. However, due to the unpredictable nature of external particle sources acting in the room during the cleaning process, such as drafts, human presence, pet presence, and the like, the TTC estimate might be biased in either direction—either overestimating or underestimating the Actual TTC. Referring to FIG. 3, this updating process is illustrated wherein w is the angular velocity of the fan, P is the pressure drop across the fan, Hach is the natural room air changes per hour, Ci is the indoor AQI which is measured using a PM 2.5 sensor, Co is the outdoor AQI (obtained from statistical data which is publicly available for most major cities), S is the upper bound of TTC, SC is a detection in change of the angular velocity of the fan, Yttc is the instantaneous TTC estimate, UL is the TTC correction, and ettc is the TTC error.

To limit the amplitude of TTC estimate bias an Actual TTC counter is started right after the speed is changed or if the AQI level goes above the target after the Target AQI is achieved. When the Target AQI becomes achieved then the Actual TTC stores the correct temporal interval which is compared to initially predicted TTC. Depending on the sign of that error the ACH calculation is corrected by including a correction term in the denominator which is equivalent to modifying the room size.

The automatic mode of control system employs the Peak AQI Controller and the TTC Controller. The Peak AQI Controller is responsible for generating proportional cleaning response to indoor AQI increases above 50 (or other pre-determined value), which is recognized as a threshold for degraded air quality which could impact health. The Peak AQI Controller increases fan angular velocity proportionally to AQI units above the threshold of 50 (or other pre-determined value) until an inflection point in AQI is reached at which the AQI begins to decrease. The fan angular velocity is then held constant until the AQI decreases below 50 (or other pre-determined value). The TTC Controller is programmed to minimize the long term particle concentration in the room by determining the baseline fan angular velocity such that the instantaneous TTC estimate in automatic mode to be maintained at a desired target. Target TTC is set to 30 minutes when human or pet presence in the room is detected (such as through a $CO_2$ or CO detector) or otherwise indicated (such as interaction with the user interface) and to 10 minutes when no human or pet presence is detected.

ACH calculation from pressure drop across the filter
    Pressure drop is calculated according to a mathematical model $P_{filter}=K_{fan} \times$Angular Velocity of the Fan+ $K_{ambient}$+Bias
    $K_{fan}$ and Bias are unknown parameters determined by an EKF with calibration sequence
    Fan curve (pressure-vs-flow) is used to calculate the Flow (in cubic meters per hour) based on the measured pressure drop.
    ACH=Flow/$V_{room}$, where $V_{room}$ is the room volume in cubic meters (based on statistical room sizes and/or as corrected by error in room air changes.
    Low pass filter for the ACH which is displayed to minimize oscillation
Target AQI calculation
    Assume exponential decay of the AQI at fixed ACH Target AQI=current_AQI*(−ACH*Time)
    Target time is 30 min
    When in manual mode and a particular ACH is programmed the user will see projected AQI which will be reached in 30 minutes of fan operation.

We claim:
1. An air purifier for a room comprising:
a fan having a plurality of fan speeds;
a filter, wherein the fan draws air through the filter;
a user interface in communication with the fan and a control system, wherein the user interface displays a mode, the fan speed, an indoor air quality index (AQI), a target AQI, and a time to achieve (TTC) the target AQI, wherein the mode is either manual mode or automatic mode;

a PM 2.5 sensor in communication with the control system; and one or more sensors selected from the group consisting of a volatile organic components (VOC) sensor, a CO sensor, and a $CO_2$ sensor, said one or more sensors located on an air intake side of the fan and said one or more sensors in communication with the control system;

wherein upon activation of the control system, the control system identifies one or more of the following: an outdoor AQI based upon a geographic location, the indoor AQI determined using information from the PM 2.5 sensor of the air purifier and the type of room in which the air purifier is placed, or a room size based upon the type of room in which the air purifier is placed, and wherein when in the manual mode, the control system further identifies a fan speed set by a user through the user interface and calculates an initial manual target AQI after thirty minutes of fan operation at the set fan speed; and wherein when in automatic mode, the control system is configured to automatically change the fan speed such that a predetermined AQI is maintained.

2. The air purifier of claim 1, wherein in the manual mode the control system is configured to further dynamically update the time to achieve (TTC) the target AQI, based upon calculated corrections to room air volume, natural room air changes per hour, and an outdoor AQI.

3. The air purifier of claim 1, wherein in the automatic mode the time to achieve predetermined AQI is set at thirty minutes when humans or pets are detected in the room.

4. The air purifier of claim 1, wherein in the automatic mode the time to achieve the predetermined AQI is set at ten minutes when humans or pets are not detected in the room.

5. The air purifier of claim 3, wherein the time to achieve the predetermined AQI is used to determine and then automatically change the fan speed.

6. The air purifier of claim 4, wherein the time to achieve the predetermined AQI is used to determine and then automatically change the fan speed.

7. The air purifier of claim 1, wherein the user interface includes a switch to turn the fan on and off.

8. The air purifier of claim 1, wherein the user interface includes toggles to adjust the fan speed.

9. The air purifier of claim 1, wherein the PM 2.5 sensor is located on the intake side of the fan.

10. The air purifier of claim 9, wherein the air purifier is configured to operate in the automatic mode and wherein the fan is in communication with the control system allowing the control system to turn the fan on and off and to set the fan speed.

11. The air purifier of claim 10, wherein the control system is configured to alter the fan speed when the indoor AQI is detected to be above a predetermined healthy value.

12. The air purifier of claim 11, wherein the AQI of the predetermined healthy value is 50.

13. The air purifier of claim 11, wherein the control system is configured to set the fan speed proportionally to the difference between the predetermined healthy value and the indoor AQI.

14. The air purifier of claim 11, wherein the control system is configured to increase the fan speed until the indoor AQI is below the predetermined healthy value and once the indoor AQI is equal to the predetermined AQI, the control system decreases the fan speed.

15. The air purifier of claim 13, wherein the predetermined healthy value is an AQI of 50.

16. The air purifier of claim 14, wherein the predetermined healthy value is an AQI of 50.

* * * * *